United States Patent [19]

Wagner et al.

[11] Patent Number: 6,101,440
[45] Date of Patent: Aug. 8, 2000

[54] CONTROLLER FOR AN AUTOMATIC MOTOR VEHICLE TRANSMISSION

[75] Inventors: Thomas Wagner, Merseburg; Michael Ulm, Alteglofsheim; Friedrich Graf, Regensburg, all of Germany

[73] Assignee: Siemens Aktiengesellschaft, Munich, Germany

[21] Appl. No.: 08/758,385

[22] Filed: Nov. 27, 1996

[30] Foreign Application Priority Data

Nov. 29, 1995 [DE] Germany .............................. 195 44 517

[51] Int. Cl.[7] .......................... B60K 17/344; F16H 61/06
[52] U.S. Cl. ............................................. 701/67; 73/118.1
[58] Field of Search ............................... 701/87, 95, 67, 701/68, 57; 73/118.1, 865.9

[56] References Cited

U.S. PATENT DOCUMENTS

| 5,062,050 | 10/1991 | Petzold et al. | 701/68 |
| 5,251,132 | 10/1993 | Bulgrien | 701/67 |
| 5,450,768 | 9/1995 | Bulgrien et al. | 74/336 R |
| 5,771,477 | 6/1998 | Showalter et al. | 701/67 |

FOREIGN PATENT DOCUMENTS

| 0 475 585 A1 | 3/1992 | European Pat. Off. . |
| 0 654 623 A2 | 5/1995 | European Pat. Off. . |
| 3506325C2 | 8/1985 | Germany . |
| 4323037A1 | 3/1994 | Germany . |
| 4240621A1 | 6/1994 | Germany . |
| 4439225A1 | 6/1995 | Germany . |
| 2 286 641 | 8/1995 | United Kingdom . |

*Primary Examiner*—George Dombroske
*Attorney, Agent, or Firm*—Herbert L. Lerner; Laurence A. Greenberg

[57] ABSTRACT

A control device for an automatic motor vehicle transmission has electrohydraulically actuated gearshift elements which increase the smoothness of shifting during a shifting operation, especially a shifting operation in a traction mode, by varying hydraulic pressure for actuating the gearshift elements. In a first phase of the shifting operation, in which idle travels of the gearshift elements are overcome, the pressure is rapidly made to approach a desired value through the use of a control signal (open-loop control) with a high duty cycle. In a second phase of the shifting operation, in which a transmission input moment changes from the gearshift element of an old gear over to the gearshift element of a new gear, the hydraulic pressure is built up with a high duty cycle. In a third phase of the shifting operation, in which a decrease in engine rpm required to carry out the gear change takes place, through a change in the duty cycle, the hydraulic pressure is first rapidly brought by open-loop control to a desired variable and thereafter is closed-loop controlled.

6 Claims, 6 Drawing Sheets

CONTROLLER FOR AN AUTOMATIC MOTOR VEHICLE TRANSMISSION

BACKGROUND OF THE INVENTION

Field of the Invention

The invention relates to a control device for an automatic motor vehicle transmission with electrohydraulically actuated gearshift elements, in which hydraulic pressure for actuating the gearshift elements is varied in multiple phases and then regulated by closed-loop control, to increase smoothness of shifting during a shifting operation, especially a shifting operation in a traction mode.

Such a controller is used for shifting an automatic motor vehicle transmission. In order to control the shifting moment necessary for a shifting transition from one gear to another, it is necessary to vary the buildup or reduction of hydraulic pressure in the gearshift elements during the shifting. The goal is to enable smooth or in other words nonjerking shifting and to keep the power loss in the friction elements of the transmission as slight as possible.

In a known method for open-loop and closed-loop control of the load transfer in an automatic transmission, in an overlap shifting operation, the moment transfer of a first engaging clutch is derived from fed-back variables. The fed-back variables control the course of a second, disengaging clutch in open-loop or closed-loop fashion in German Published, Non-Prosecuted Patent Application DE 42 40 621 A1.

In a likewise known controller for automatic vehicle transmissions with a hydraulically actuated friction-locking element, a so-called inertia phase holding time is measured, during which the gear ratio is changed. The holding time is varied by varying the hydraulic pressure for the friction-lock element, in order to avoid a perceptible shifting jerk from excessive hydraulic pressure at the end of the holding time. The hydraulic pressure is raised, regardless of the status of the pressure adjusting device, whenever the onset of the holding time occurs later than a predetermined time value in German published, Non-Prosecuted Patent Application DE 43 23 037 A1.

SUMMARY OF THE INVENTION

It is accordingly an object of the invention to provide a controller for an automatic motor vehicle transmission, which overcomes the hereinafore-mentioned disadvantages of the hereto ore-known devices of this general type and which varies hydraulic pressure for actuating gearshift elements (clutch pressure) in such a way that shifting events in the transmission are carried out with the greatest possible smoothness of shifting and with the least possible burden on the gearshift elements (or friction elements, such as clutches and brakes, etc.).

With the foregoing and other objects in view there is provided, in accordance with the invention, a control device for an automatic motor vehicle transmission having electrohydraulically actuated gearshift elements actuated by hydraulic pressure varied in multiple phases and then regulated by closed-loop control for increasing smoothness of shifting during a shifting operation, especially a shifting operation in a traction mode, comprising rapidly bringing the hydraulic pressure to a desired variable by an open-loop control signal with a long duty cycle, in a first phase of the shifting operation in which idle travels of the gearshift elements are overcome; building up the hydraulic pressure with a high uty cycle in a second phase of the shifting operation in which a transmission input moment changes over from the gearshift element of an old gear to the gearshift element of a new gear; and first rapidly open-loop controlling the hydraulic pressure to approach a desired variable, and thereafter closed-loop controlling the hydraulic pressure through a change in the duty cycle in a third phase of the shifting operation in which a drop in engine rpm required to perform the gear change takes place.

In accordance with another feature of the invention, there is provided a fuzzy logic pilot control defining the duty cycle at the beginning of the third phase of the shifting operation.

In accordance with a further feature of the invention, the fuzzy logic pilot control receives a standardized transmission input moment and a standardized servo moment factor as input variables.

In accordance with an added feature of the invention, there is provided fuzzy logic controller defining the duty cycle in the course of the third phase of the shifting operation.

In accordance with a concomitant feature of the invention, the fuzzy logic controller receives a standardized difference between a desired rise and an actual rise in the rpm of the engaging gearshift element, and a derivation over time of that difference, as input variables.

Other features which are considered as characteristic for the invention are set forth in the appended claims.

Although the invention is illustrated and described herein as embodied in a controller for an automatic motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
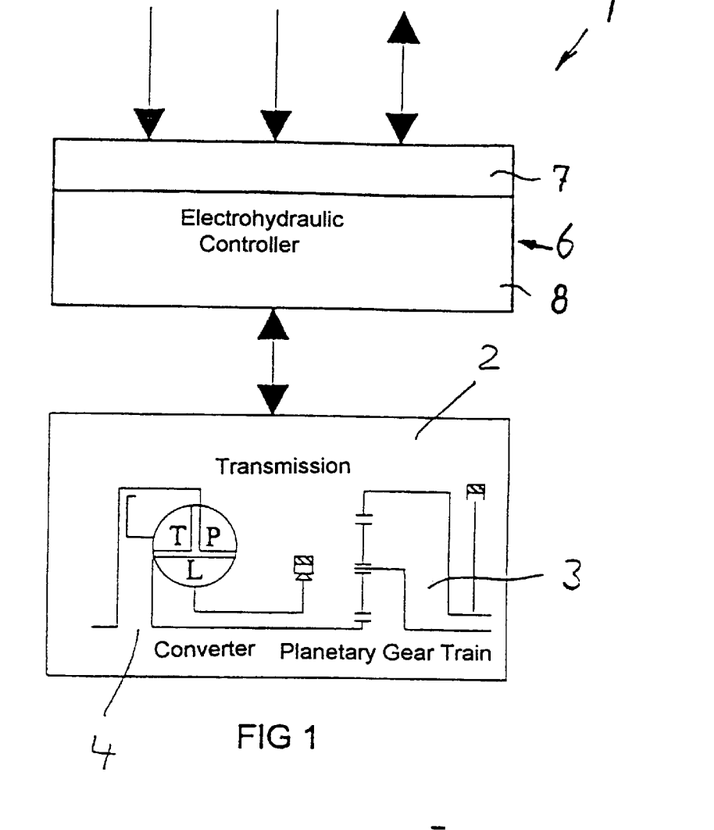
FIG. 1 is a schematic and block diagram showing a layout of an automatic transmission with a control device according to the invention.

Referring now to the figures of the drawings in detail and first, particularly, to FIG. 1 thereof, there is seen a drive 1 of a motor vehicle that includes a transmission 2 which has a planetary gear train 3 that is constructed, for instance, as a Ravigneaux, Simpson or Wilson type of structure, for rpm and torque conversion. A hydrodynamic torque converter 4, also known as a Fottinger converter, which is used as a startup element, can be bypassed with a non-illustrated mechanical clutch to improve efficiency. The transmission is controlled by an electrohydraulic controller 6 (that is sometimes also merely called a controller), which receives commands and data from the driver and the motor vehicle and exchanges data with the engine, as is indicated in the drawing. The controller 6 includes an electronic transmission control unit 7 (also referred to below as an EGS) in the narrower sense, and a hydraulic actuation part 8 that is controlled by the electronic control unit and supplies pressure fluid to actuators for various friction elements (that are also referred to as friction-locking elements) in the transmission, such as clutches, brakes and free wheels.

Figure 2:
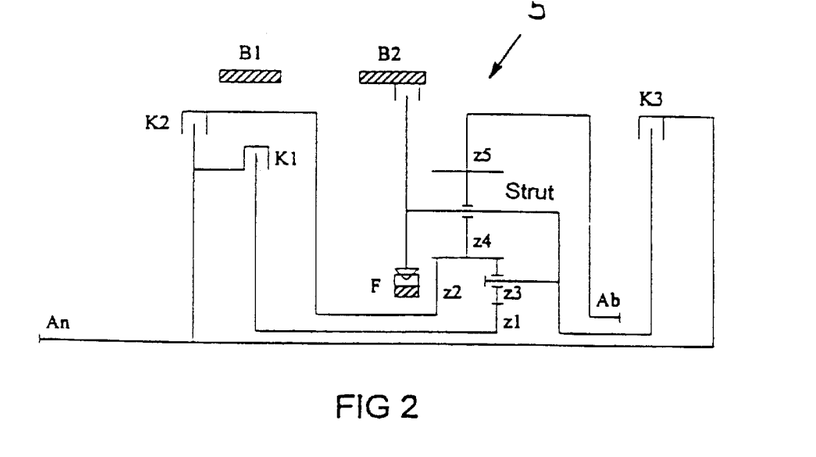
FIG. 2 is a schematic diagram showing components of the transmission of FIG. 1 that are essential for computer ascertainment of transmission data.

The automatic transmission 2 in the example described herein is constructed as a converter-type, four-speed transmission. The basic layout of a four-speed transmission 5 can be seen from FIG. 2, in which a planetary gear on the Ravigneaux principle and a plurality of clutches and brakes are shown to provide the gear shifting operations, but not to provide the hydrodynamic torque converters 4. The components of the transmission are as follows: an input or drive shaft An, an output or power takeoff shaft Ab, a first clutch K1, a second clutch K2, a first brake B1, a second brake B2 and a free wheel F. The gear wheels of the transmission are identified by their numbers of teeth listed as follows: z1=26 for a small sun wheel, z2=34 for a large sun wheel, z3=22 for a short planet wheel, z4=20 for a long planet wheel and z5=74 for a hollow wheel.

A fast gear (overdrive) is realized by connecting the transmission input with a support member of the first gear (strut) through an additional clutch. The support member both in fourth gear and second gear is the large sun wheel. Through the use of this kind of construction, it is possible to dispense with one additional group to achieve the overdrive gear.

The two primary tasks of an electronic transmission controller are controlling a shifting point and controlling a shift transition. Shifting point control is carried out in a known manner through performance graphs (where a memorized throttle valve position is plotted over the output rpm). The choice of performance graphs stored in the control unit (such as "sporty", "economy" and "winter") is carried out manually or adaptively by the evaluation of variables measured while the vehicle is in operation.

By far the more-complex part of the electronic transmission controller is the control of the shifting transition. With its aid, the "softest" possible gear change is sought. In order to accomplish this, not only must the pressure in the friction elements involved in the shifting be varied, but many other activities, shown in the table below, are necessary. A shifting transition that meets modern demands for an automatic transmission can be attained only by using so-called smart control electronics. In terms of circuitry (hardware) this requires a large scale of component integration and high performance on the part of the microcontrollers being used, since a large number of data must be processed in a very short time.

| Control of Shifting Transition | | | | |
|---|---|---|---|---|
| mechanical provisions | engine moment control | pressure control | pressure control over operating time | converter clutch control |
| free wheel shifting adaptation of oscillating masses friction lining-ATF combination | varying engine moment during shifting | controlling the pressure building in the gearshift elements controlling the shifting moment | taking into account the change in parameters over time | opening the conveyor clutch during shifting |

The two essential aspects of shifting transition control are the control of engine torque (also referred to as engine moment control) and pressure control. In engine moment control, intervention into the engine controller is made during shifting. To that end, data are exchanged between the transmission controller and the engine controller. The shifting and release of the gearshift elements in the transmission are controlled with the aid of the pressure control. To that end, a pressure modulation is performed with proportional or fast-switching valves. Both aspects are closely related and affect one another.

In the context of the present invention, a fuzzy-logic-based shifting transition controller was developed and tested with a "closed-loop" simulation. The main emphasis was traction shifting.

Essentially, the following steps were carried out:
preparation of a simulated model for a four-speed Ravigneaux transmission within a simple drive train,
construction of a model for the hydraulic controller,
construction of a fuzzy-logic-based engine moment controller,
construction of a fuzzy-logic-based pressure controller, testing of the shifting transition control in the simulation.

The use of fuzzy systems for controlling the automatic transmission 2 was chosen because of the complexity of the stated object and the many variables to be processed. Moreover, such a system can be prepared relatively quickly with available development systems (tools).

The control of the engine torque in shifting operations in the traction mode is described in co-pending U.S. patent application Ser. No. (Attorney's Docket No. GR 95 P 2173), filed on the same date as the instant application.

In automatic transmissions, three types of gearshift elements are used: free-wheels, brakes and clutches. Free-wheels serve to connect a shaft to the housing. They permit a differential rpm in one only direction. They may be constructed as a screw-type, roller-type or clamping block-type free-wheel. In automatic transmissions, they serve the purpose of self-control of the gear change. In other words, if the support member of the old gear is a free-wheel, then it releases exactly at the instant when the clutch of the new gear takes on the one-fold input moment. So-called overlap-free shifting operations can thus be attained, which furnish an optimal shifting transition. However, the use of free-wheels necessitates considerably greater engineering expense, since they must be bypassable in the overrunning mode, to allow engine braking (for instance in downhill driving). In order to achieve gear shifting operations, controllable clutches and brakes are required. While a clutch force-lockingly connects rotating components and thus transmits a torque, a brake firmly couples rotating parts to the transmission housing. A force-locking connection is one which connects two elements together by force external to the elements, as opposed to a form-locking connection which is provided by the shapes of the elements themselves.

Figure 3:
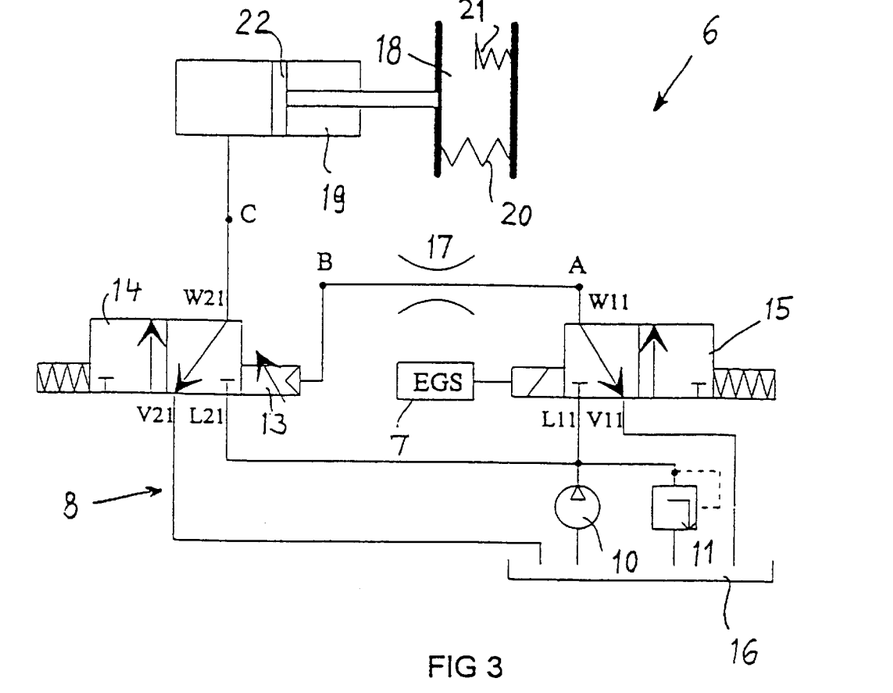
FIG. 3 is a schematic diagram showing details of the electrohydraulic control device of FIG. 1.

The electrohydraulic control device 6 shown in FIG. 3 includes the following: an oil pump 10, pressure limiting valves 11, proportional magnets 13 by which magnet valves, such as multiposition valves in the form of proportional valves 14 and fast-switch valves 15, are actuated, non-illustrated check valves, a reservoir device or tank 16 and throttles 17. Some of these elements are present multiple times, but are shown herein only once for the sake of simplicity. They are installed close together (except for the oil pump) in one housing and communicate with one another through conduits.

The magnet valves serve to modulate the main pressure set by the oil pump 10 and the pressure limiting valve 11. The proportional valves 14 are multiposition valves without fixed switching positions. With them, the direction and magnitude of the volumetric flow can be varied continuously as a function of the input current at the proportional magnet 13. The proportional magnets 14 enable a very accurate pressure regulation, but are expensive. This disadvantage can be circumvented by using the fast-switch valves 15. Fast-switch valves are multiposition valves with two switching positions. They are controlled directly by a pulse width modulated signal (PWM signal) and thus generate a volumetric flow that is dependent on the duty cycle of the PWM signal. The volumetric flow fluctuates severely and is therefore smoothed by a hydraulic PT1 member (throttle and reservoir). The volumetric flow set through the use of the proportional or fast-switch valves 14 or 15 is carried (optionally through further non-illustrated multiposition valves) to the gearshift elements of the transmission. As an example of the gearshift elements, FIG. 3 shows a clutch 18, which is actuated by an actuator in the form of a hydraulic cylinder 19. The clutch halves are pressed apart by restoring springs 20. One restoring spring 21 schematically represents the spring force of the friction elements of the clutch. Both springs counteract a force exerted on the clutch 18 by a clutch piston 22 of the hydraulic cylinder 19.

Particular attention is also paid to the machine element represented by oil (ATF=automatic transmission fluid). It must meet particular demands with respect to temperature performance, viscosity performance, wear protection, compatibility with other substances and the effect on the coefficient of friction. Aside from its function as a control medium, the oil is used for lubrication and cooling.

Two gearshift elements are always involved in one shifting operation in an automatic vehicle transmission. One gearshift element is the carrier of the old gear (disengaging gearshift element), while the other gearshift element selects the new gear (engaging gearshift element). Depending on the type of engagement or disengagement of the gearshift elements, shifting operations with positive and negative overlap, as well as overlap-free shifting operations, are attained. If the element of the old gear is turned off without the element of the new gear being capable of taking over the full transmission input moment, then it is said that a shifting operation with negative overlap has occurred. The consequence is an interruption in traction, which is unacceptable for upshifting operations. Such shifting transitions are possible in downshifting, since the increase in engine rpm that occurs in a traction interruption is counteracted by the increase in engine rpm necessary for downshifting.

A nonoverlapping shifting operation exists whenever the clutch of the old gear turns off precisely when the engaging clutch has taken over the full transmission input moment. Non-overlapping shifting operations are attained by constructing the disengaging gearshift element as a free-wheel. The best course of the transmission output moment is attained with this type of shifting operation. Achieving overlap-free shifting operations is very complicated and expensive, since the free-wheels used must be bypassable for certain operating states (utilization of the braking action of the engine in the overrunning mode). Shifting operations with positive overlap therefore represent an inexpensive alternative to the overlap-free shifting operations.

Shifting operations with positive overlap are attained if the clutch of the old gear still remains excited even though the engaging clutch has already taken over the full transmission input moment. This type of shifting transition, as compared with the overlap-free shifting operation, produces a less-favorable course of the output moment, because a reduction in output moment occurs with simultaneous excitation of both clutches.

In detail, an overlap-free traction shifting operation (traction upshifting) proceeds as follows: Until the beginning of the shifting operation, the gearshift element of the old gear is engaged and the gearshift element of the new gear is disengaged. In the present case, the gearshift element of the old gear is a free-wheel. Loading of the clutch of the new gear begins with a shifting signal generated in the transmission controller 7 and after the load time, this clutch begins to transmit a moment. This moment is dependent on the clutch pressure and on the geometry of the clutch. The moment transmitted by the free-wheel drops by the same extent as the moment transmitted by the clutch of the new gear rises. The transmission capability of the clutch of the new gear increases further, until it is capable of taking over the full transmission input moment. At that instant, the free-wheel must transmit a negative moment. The result of this is that the free-wheel disengages.

The torque at the clutch of the new gear must then be increased further, to assure the rpm decrease of the engine.

This moment multiplication must be carried out in such a way that on one hand the engine is not "stalled" but on the other hand the slip time of the clutch of the new gear does not become overly long. The end of shifting is reached when, as a consequence of the reduction in engine rpm, rpm equality prevails between the halves of the clutch of the new gear, or in other words the clutch catches. At that instant, the moment transmitted by the clutch drops back to the holding moment, which is not determined by the data of the clutch or by the clutch pressure. It must merely be less than the breakaway moment of the clutch. The pressure at the clutch is raised to a safety level.

Upon downshifting with gas (traction downshifting), an interruption in traction occurs during the shifting transition. The engaging gearshift element is constructed in this case as a free-wheel. The shifting operation proceeds as follows: With the command to shift, the excitation of the clutch of the old gear drops off and the clutch begins to slip. The transmission input moment and transmission output moment drop proportionally to the excitation of the clutch of the old gear, and the engine rpm rises. If the moment at the disengaging clutch becomes zero, then the traction interruption begins. The engine rpm then rises very sharply, since the engine can use all its energy for its own acceleration. If the engine rpm reaches the synchronizing rpm, then the clutch of the new gear can engage, or the free-wheel can engage. The main problem of this shifting sequence is to engage the gearshift element of the new gear exactly at the synchronizing point. The motor must be prevented from racing under any circumstances.

The following discussions relate to traction shifting operations. These are the most-critical shifting operations with respect to the burden on the gearshift elements. Such a shifting operation can be divided into three phases shown in FIG. 4: first, a charging phase, second a so-called torque phase and third a so-called inertia phase.

Since the gearshift elements, such as the clutch 18, are not allowed to transmit any further residual moment in the disengaged state, the element halves must be spatially separated from one another. The result of this is that when an element is engaged, some idle travel must be overcome before a moment can be transmitted by that element. The phase from pressure imposition until transmission of a moment is called the charging phase. The length of this phase is dependent on many parameters, and it must be ascertained exactly if a gentle shifting transition is to be accomplished.

The torque phase is the period of time in which the gearshift element of the new gear takes over the transmission input moment from the gearshift element of the old gear. It ends when the full input moment is taken over by the engaging element. Accordingly, the torque phase is characterized by changes of moment at the gearshift elements.

In the inertia phase, a drop in engine rpm occurs, which is necessary to perform the gear change. It follows the torque phase directly, and it ends with the shifting operation.

Figure 4:
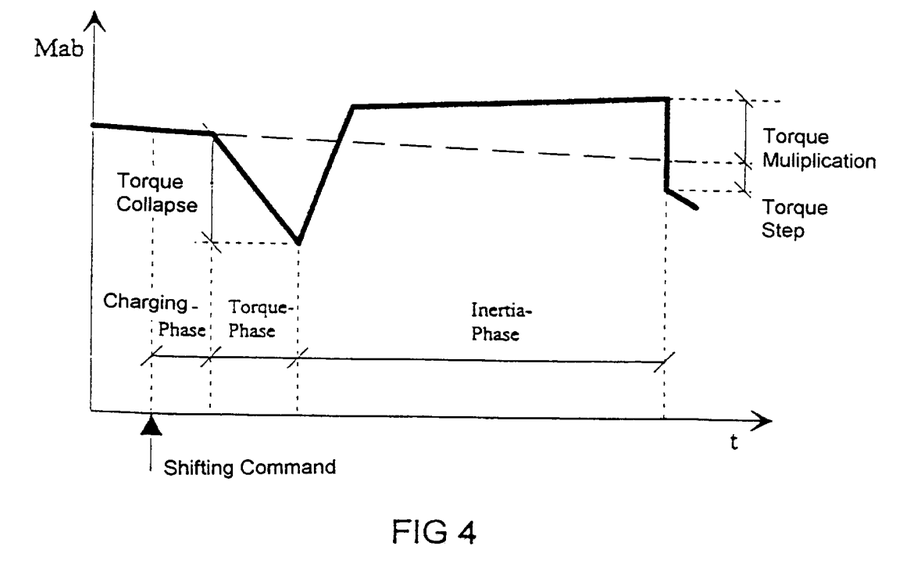
FIG. 4 is a graph showing a course over time of an output moment of a transmission in a traction shifting operation.

FIG. 4 illustrates these characteristic phases of the shifting transition in terms of the course over time of the transmission output moment. The collapses and jumps in output moment that occur during the shifting transition can be seen from this drawing. These "discontinuities" and the duration of the shifting operation are the essential criteria for subjective evaluation of the quality of the shifting. Optimizing these criteria is achieved by the provisions described below for open-loop and closed-loop control of the clutch pressure.

In order to control the shifting moment that is necessary for the shifting transition, it is necessary to vary the pressure buildup and the pressure reduction in the gearshift elements. A traction shifting operation is the foundation for developing an open-loop and closed-loop control algorithm. The disengaging gearshift element is constructed as a free-wheel. In other words, only one triggering of the engaging gearshift element is required.

In considering the physical bases of pressure control, it has proved to be expedient to breakdown the traction shifting operations into the three phases shown in FIG. 4. As already mentioned above, the clutch piston 22 must traverse a certain idle travel (charging phase) after the shifting command. Since in this range only a restoring spring 20 with a relatively low spring constant (0.7E4 N/m) counteracts the force engaging the clutch piston, only a slight pressure is established. In order to overcome this charging phase as fast as possible, the fast-switch valve is triggered in this range with a duty cycle of 100%. The torque phase of the shifting operation starts once the engaging clutch begins to slip. That is, the idle travel has been overcome, the clutch halves touch one another and they begin to transmit torque. With the onset of this phase, the engaging force, in addition to the restoring spring 21, still counteracts the spring force of the friction elements. The spring constant of the friction elements is very high (greater by a factor of 100) in comparison with the spring constant of the restoring spring, so that the pressure in the clutch chamber rises sharply. This range as well, in which the engaging clutch takes over the input moment from the disengaging clutch (in this case the free-wheel) should be overcome as fast as possible. For this reason, triggering with a duty cycle of 100% is carried out in the torque phase as well.

If the engaging clutch 18 has taken over the one-fold transmission input moment, then the free-wheel F disengages. This ends the torque phase and the inertia phase begins. In that phase, the shifting pressure in the engaging element must be set in such a way that the shifting operation can be ended within an acceptable length of time with the least possible moment multiplication. The triggering cannot be carried out in this range with a duty cycle of 100%, because that would cause an overly pronounced moment multiplication at the transmission output. In the inertia phase, the course of the output moment and thus the smoothness of shifting are thus substantially affected by the "intelligent" shifting pressure control according to the invention. When the engaging clutch catches, then the end of shifting is attained, and the pressure has risen to a maximum value that assures secure holding of the engaged clutch. The maximum pressure at the end of shifting is not set by the duty cycle but rather by an increased system pressure.

The open-loop and closed-loop control of the pressure buildup in the gearshift elements 18, 19 will now be described in detail. A fundamental frequency of 50 Hz which has been defined for the PWM signal for triggering the fast-switch valve of the engaging clutch, is a value proven in practice. As already explained, the engaging clutch is triggered with a 100% duty cycle in both the charging phase and the torque phase. Both phases should be overcome as fast as possible, so that there is still enough time for the synchronizing procedure in the inertia phase. With a duty cycle of 100%, the maximum possible pressure buildup is attained in these phases.

In the inertia phase, through the clutch pressure, a moment is to be set such as to assure the drop in engine rpm and therefore the synchronization of the engine and transmission with in a slip time that is optimal both in terms of smooth shifting and in terms of the load on the friction elements. An excessively high clutch moment worsens the smoothness by multiplying the transmission output moment. An overly low clutch moment causes an overload on the friction elements by lengthening the slip time.

Three options are conceivable for varying the clutch pressure during the inertia phase: purely open-loop pressure control, purely closed-loop pressure control, or a combination of these variants, with which the disadvantages of the first two options are avoided, and which is therefore employed in this case. Through the use of a pilot control, which at the onset of shifting sets a relatively high duty cycle for the onset of the inertia phase, the actual variable can rapidly be approximated to the desired variable, so that the then-activated controller need process only slight differences between the desired and actual variables. This combination of open-loop and closed-loop control, while the most complicated and expensive of the three variants, nevertheless produces the best results in terms of the course of shifting.

A pilot control that is constructed in accordance with the third variant above will now be explained. A pilot control algorithm, which defines a duty cycle for the pilot control, was achieved with a fuzzy logic pilot controller 24 seen in FIG. 5. Through the use of the duty cycle, the pressure rise at the beginning of the inertia phase is intended to be set in such a way that on one hand the clutch moment rapidly rises to the value needed for reducing the engine rpm, but on the other hand this rise does not become too great to prevent moment multiplication at the beginning of the inertia phase. Input variables for the algorithm of the fuzzy logic pilot controller 24 are the transmission input moment m1_norm standardized to its maximum value, and the servo moment factor xi_norm, standardized to the maximum value, for the particular shifting operation. The necessary clutch moment during the inertia phase can be derived from these variables.

Figure 5:
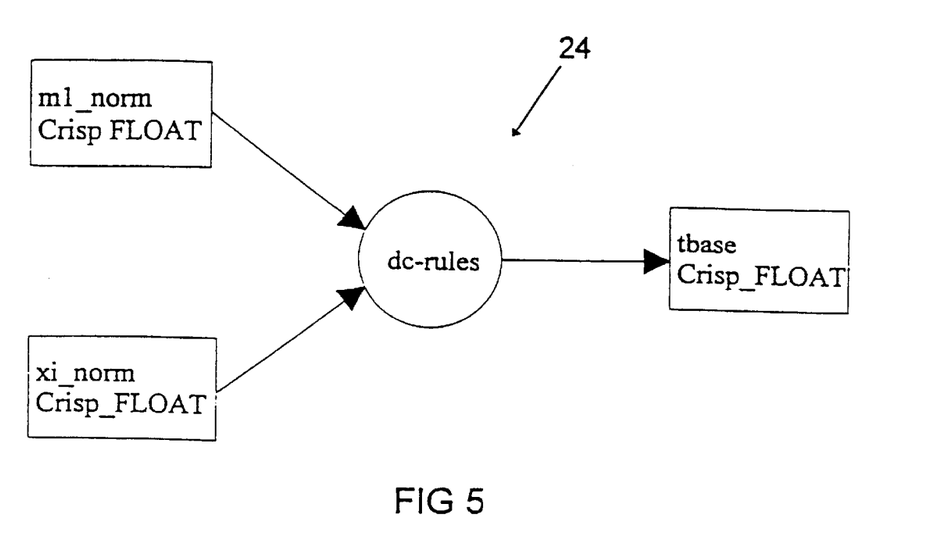
FIG. 5 is a block diagram of a fuzzy controller for a pilot control of the automatic transmission of FIG. 1.

The transmission input moment is calculated through the converter data. This also provides information on changes in load conditions (such as an increased hill climbing resistance). The output variable of the algorithm is the pulse width tbase, standardized to the period length, of the PWM signal. The pilot control algorithm is called up at the beginning of shifting, and it parametrizes the basic duty cycle for the inertia phase.

FIG. 5 shows the basic structure of the fuzzy algorithm for defining a basic duty cycle for the inertia phase. The associated rule base RULEBASEeinert1_rules is shown below.

```
RULEBASE inert1-rules
RULE Rule1
  IF(kapnorm IS HIGH)AND(m1norm IS LOW)THEN tpul_inert1 =
  LOW
END
RULE Rule2
  IF(kapnorm IS LOW)AND(m1norm IS LOW)THEN tpul_inert1 = MED
END
RULE Rule3
  IF(kapnorm IS MED)AND(m1norm IS LOW)THEN tpul_inert1 = LOW
END
RULE Rule4
  IF(kapnorm IS HIGH)AND(m1norm IS MED)THEN tpul_inert1 =
  LOW
END
RULE Rule5
  IF(kapnorm IS MED)AND(m1norm IS MED)THEN tpul_inert1 = MED
END
RULE Rule6
  IF(kapnorm IS LOW)AND(m1norm IS MED)THEN tpul_inert1 = MED
END
```

-continued

```
RULE Rule7
  IF(kapnorm IS LOW)AND(m1norm IS HIGH)THEN tpul_inert1 =
  HIGH
END
RULE Rule8
  IF(kapnorm IS MED)AND(m1norm IS HIGH)THEN tpul_inert1 =
  HIGH
END
RULE Rule9
  IF(kapnorm IS HIGH)AND(m1norm IS HIGH)THEN tpul_inert1 =
  MED
END
END
```

Upon a conceivable shifting operation carried out only with such a pilot control, the smoothness of shifting is unsatisfactory, because a pronounced multiplication of the output moment occurs in the inertia phase. This output moment multiplication is eliminated with the aid of a closed-loop control of the pressure buildup. A negative desired rise in the differential rpm of the engaging gearshift element is calculated as a desired variable for the pressure controller. This is obtained from the quotient of the differential rpm ndiffsstart of the engaging element at the onset of shifting and a desired time for the length of the inertia phase. This desired time has been defined as 0.4s for the traction shifting operation. The slight change in differential rpm between the beginning of shifting and the start of the inertia phase is not expressed as an error in calculating the desired rise for the inertia phase. The differential rpm of the engaging clutch during the shifting operation is determined as ndiffs. The actual rise can in turn be calculated during the shifting operation from the transmission input and output rpm and the rpm factors.

Figure 6:
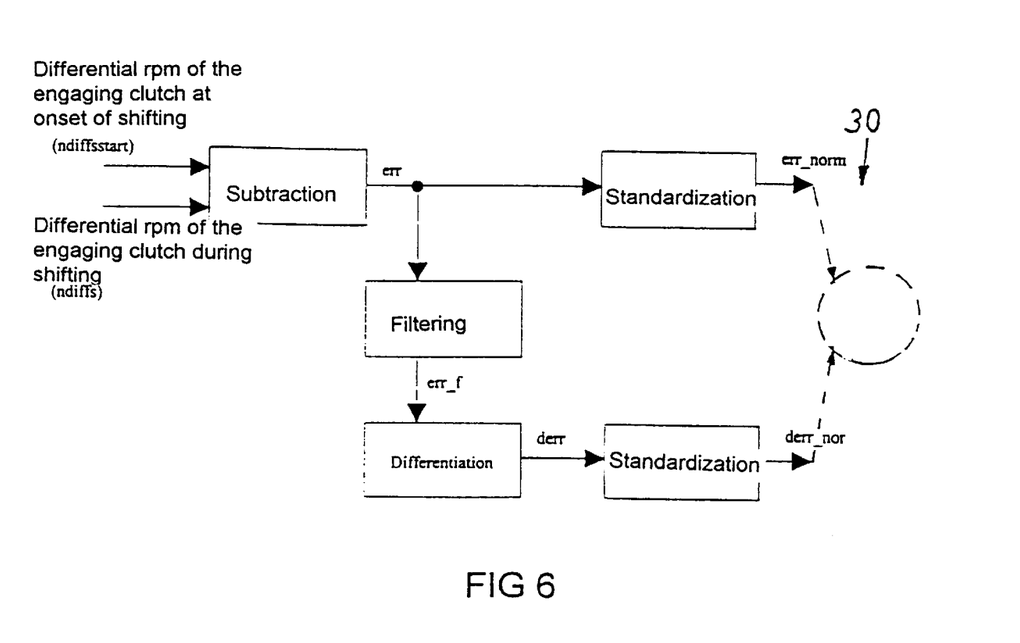
FIG. 6 is a block diagram of a preparation circuit for input signals of fuzzy controller.
Figure 7:
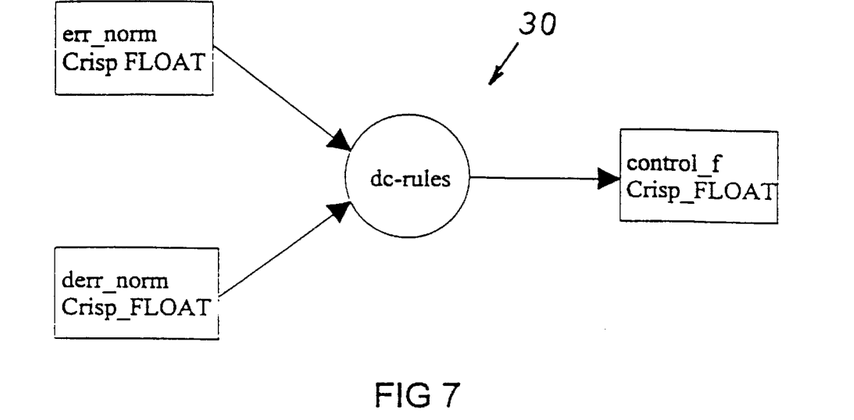
FIG. 7 is block diagram of a fuzzy controller for regulating pressure buildup in an inertia phase.

The difference between the desired rise and the actual rise produces an input variable for a fuzzy controller 30 shown in FIGS. 6 and 7, which is referred to as err and is standardized to its maximum value. The second input variable for the controller is the derivation over time (derr) of this difference. Once again, standardization to the maximum value is carried out. Since the signal derr fluctuates severely, filtering is necessary. It has proved to be favorable not to filter the derr signal directly but rather to filter the err signal before its derivation over time. To that end, a PT1 filter with a time constant of 20 ms is used.

FIG. 6 shows the signal preparation for the fuzzy controller 30 and FIG. 7 shows the structure of the controller 30, which also corresponds to the structure of the associated fuzzy algorithm. The output variable of the controller is a value control_f, with which the basic duty cycle set by the pilot control algorithm can be varied, that is a factor (0 . . . 1) for closed-loop control of the pulse width of the control signal. The controller is constructed as a simple fuzzy controller, having advantages which are above all the ease of construction and the easy handling of relatively imprecisely determinable input variables. Such imprecisions come into play on one hand from the use of the differential rpm at the onset of shifting to calculate the desired rise in the inertia phase, and on the other hand from the quantization of the input variables err and derr.

The comparison of the actual variable and the desired variable is carried out during the entire inertia phase. If the actual variable reaches the desired variable for the first time solely through the use of the pilot control, then the controller is also called up for the first time then. This assures that the controller, at the beginning of its operation, needs to process only a small difference between the desired and actual values. In the further course of the inertia phase, the fuzzy controller is called up every 10 ms. The sampling of the input variables likewise takes place every 10 ms.

The rule base RULEBASEducy_rules of the controller 30 is shown below.

```
RULEBASE ducy_rules
RULE Rule1
  IF(err_norm IS PM)AND(derr_norm IS PM)THEN control_f = VL
END
RULE Rule2
  IF(err_norm IS PM)AND(derr_norm IS P)THEN control_f = VL
END
RULE Rule3
  IF(err_norm IS PM)AND(derr_norm IS Z)THEN control_f = MED
END
RULE Rule4
  IF(err_norm IS PM)AND(derr_norm IS N)THEN control_f = MED
END
RULE Rule5
  IF(err_norm IS PM)AND(derr_norm IS NM)THEN control_f = MED
END
RULE Rule6
  IF(err_norm IS P)AND(derr_norm IS PM)THEN control_f = VL
END
RULE Rule7
  IF(err_norm IS P)AND(derr_norm IS P)THEN control_f = LOW
END
RULE Rule8
  IF(err_norm IS P)AND(derr_norm IS Z)THEN control_f = MED
END
RULE Rule9
  IF(err_norm IS P)AND(derr_norm IS N)THEN control_f = MED
END
RULE Rule10
  IF(err_norm IS P)AND(derr_norm IS NM)THEN control_f = HIGH
END
RULE Rule11
  IF(err_norm IS Z)AND(derr_norm IS PM)THEN control_f = MED
END
RULE Rule12
  IF(err_norm IS Z)AND(derr_norm IS P)THEN control_f = MED
END
RULE Rule13
  IF(err_norm IS Z)AND(derr_norm IS Z)THEN control_f = HIGH
END
RULE Rule14
  IF(err_norm IS Z)AND(derr_norm IS N)THEN control_f = HIGH
END
RULE Rule15
  IF(err_norm IS Z)AND(derr_norm IS NM)THEN control_f = HIGH
END
RULE Rule16
  IF(err_norm IS NM)AND(derr_norm IS NM)THEN control_f = VH
END
RULE Rule17
  IF(err_norm IS NM)AND(derr_norm IS N)THEN control_f = VH
END
RULE Rule18
  IF(err_norm IS NM)AND(derr_norm IS Z)THEN control_f = HIGH
END
RULE Rule19
  IF(err_norm IS NM)AND(derr_norm IS P)THEN control_f = MED
END
RULE Rule20
  IF(err_norm IS NM)AND(derr_norm IS PM)THEN control_f = MED
END
RULE Rule21
  IF(err_norm IS N)AND(derr_norm IS NM)THEN control_f = VH
END
RULE Rule22
  IF(err_norm IS N)AND(derr_norm IS N)THEN control_f = HIGH
END
RULE Rule23
  IF(err_norm IS N)AND(derr_norm IS Z)THEN control_f = HIGH
END
RULE Rule24
  IF(err_norm IS N)AND(derr_norm IS P)THEN control_f = MED
END
RULE Rule25
  IF(err_norm IS N)AND(derr_norm IS PM)THEN control_f = LOW
END
END
```

Figure 8:
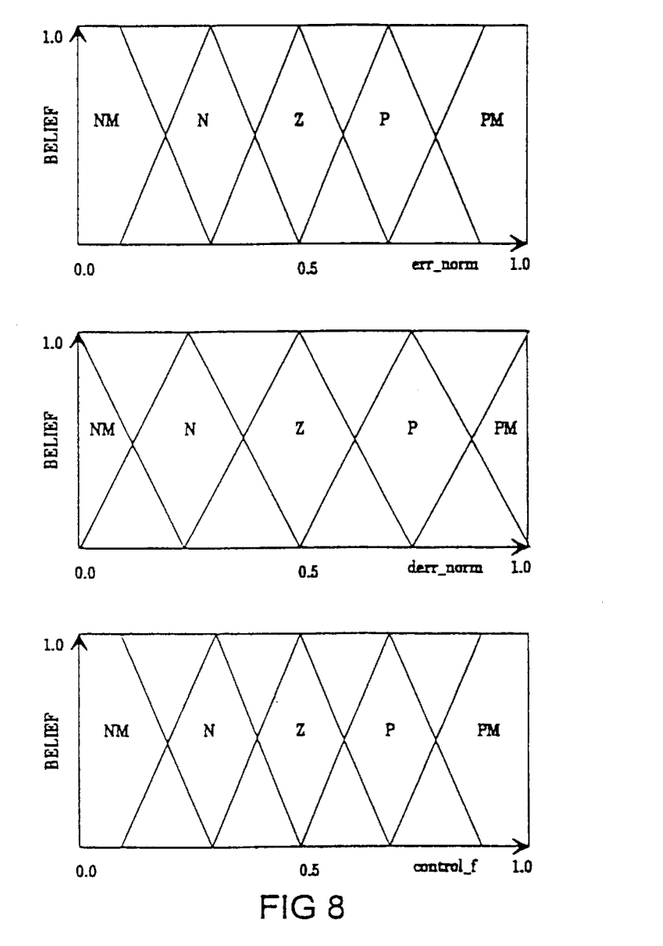
FIG. 8 is graph showing membership functions of input variables nd output variables of the fuzzy controller of FIG. 7.

The membership functions of the input variables err_norm, derr_norm and of the output variable control_f of the fuzzy controller 30 can be seen in FIG. 8, specifically in that order from top to bottom.

In FIGS. 9–12, the results of a full-load traction shifting operation with open-loop and closed-loop pressure control and engine moment intervention of a control device 6 according to the invention are shown in the form of graphs. The fundamental frequency of the PWM signal used for open-loop pressure control is 50 Hz.

Figure 9:
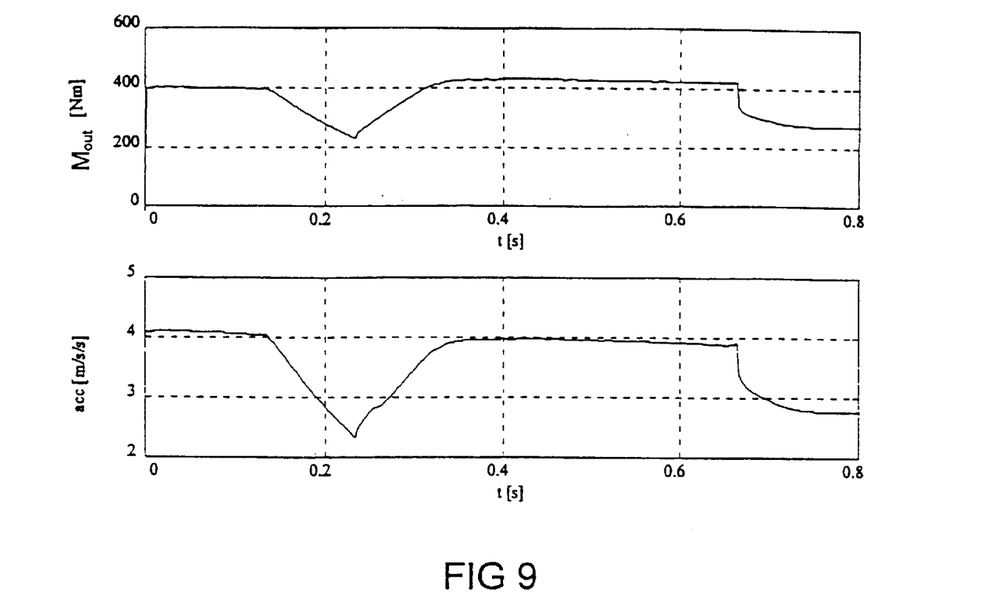
FIG. 9 is a graph showing a course of a transmission output moment and a transmission output acceleration.

The course over time of the transmission output moment $M_{out}$ (top graph) and the transmission output acceleration acc (bottom) are shown in FIG. 9.

Figure 10:
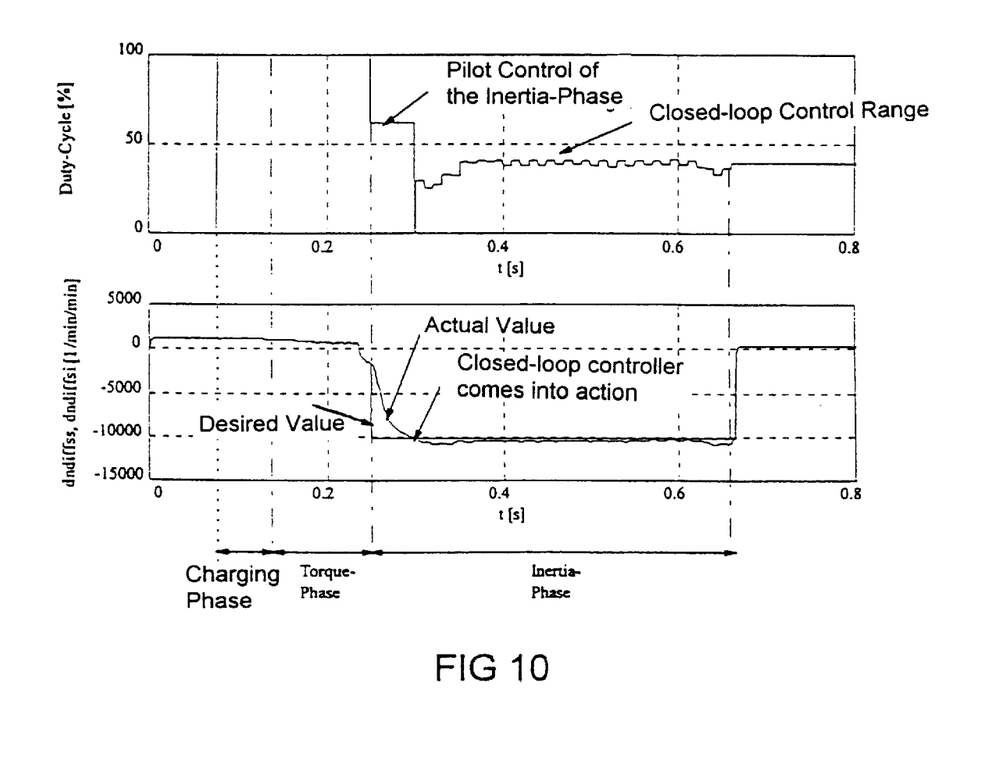
FIG. 10 is a graph showing a course of a duty cycle and of desired and actual variables.

The course over time of the duty cycle Duty-Cycle (top) and of the desired and actual variables $dndiffs_s$, $dndiffs_i$ (bottom) in all phases of a shifting operation are shown in FIG. 10.

Figure 11:
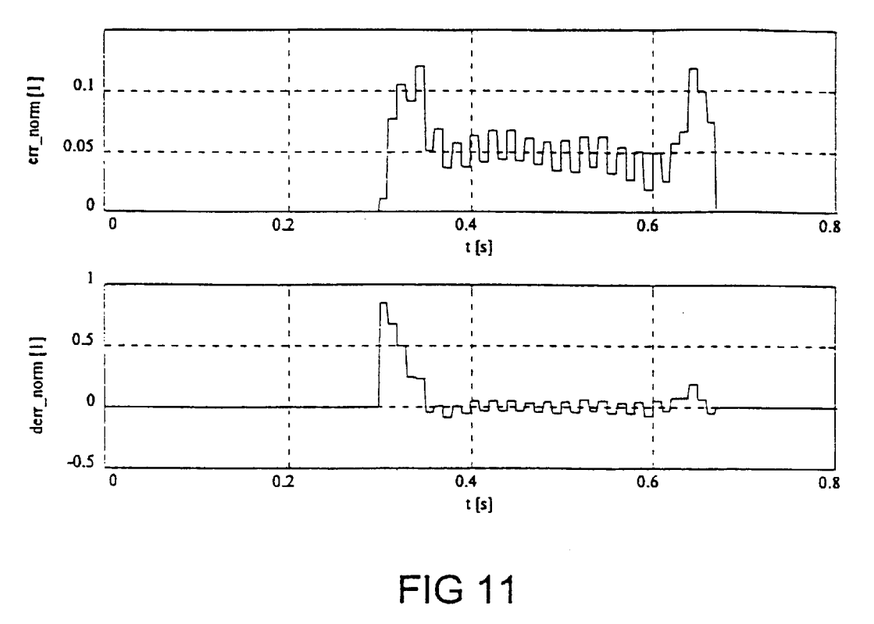
FIG. 11 is a graph showing a course of two signals sampled in the control device of FIG. 1.

The course over time of the sampled signal err_norm (top) and the sampled signal derr_norm (bottom) are shown in FIG. 11.

Figure 12:
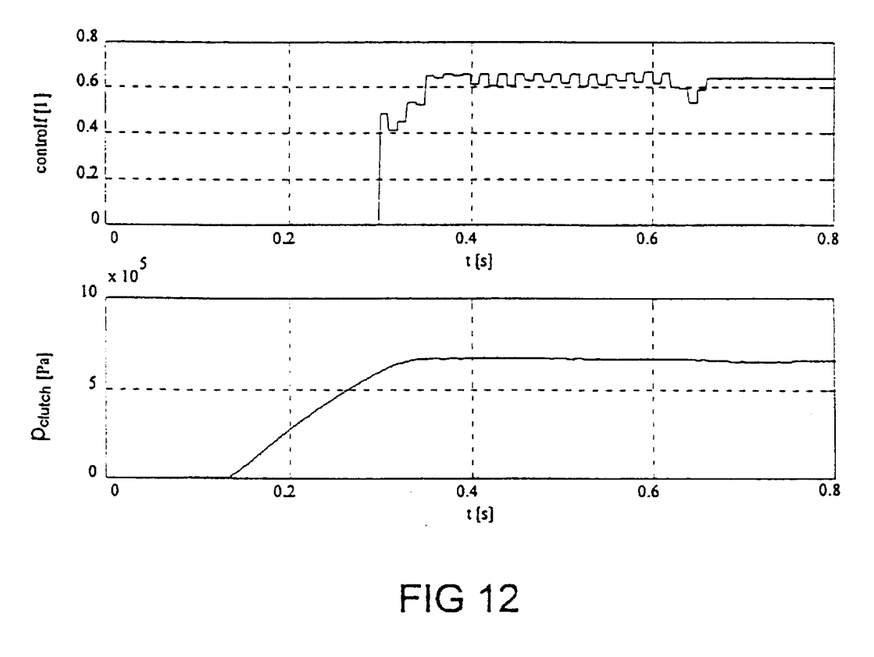
FIG. 12 is a graph showing a course of a controller output variable and clutch pressure in an automatic transmission controlled according to the invention.

Finally, the course over time of the controller output variable controlf (top) and the clutch pressure $p_{Clutch}$ (bottom) are shown in FIG. 12. The output variable controlf of the controller is a value with which the basic duty cycle set by the pilot control algorithm can be varied, that is a factor (0 . . . 1) for closed-loop control of the pulse width.

A markedly improved course of the output moment in comparison with pure pilot control can be seen from FIG. 9. The moment multiplication in the inertia phase is very slight, and the moment jump to the holding moment at the end of shifting is also substantially smaller. The acceleration at the output shaft likewise has a very good course. No multiplication of the acceleration in the inertia phase of the shifting operation occurs. The level of the output acceleration during the inertia phase is approximately at the same level as before the shifting operation.

The action of the pilot control is clearly seen from FIG. 10. At the beginning of the inertia phase, the actual value is still far from the desired value. Through the use of the pilot control, this difference is rapidly overcome, without producing excessive overswing. If the controller comes into action, then the difference between the desired and actual values is relatively slight. Conversely, the rise in this difference (because of system dynamics), is very great at this moment, as is seen in FIG. 11.

A further improvement in the open-loop control according to the invention can be attained by adapting the duty cycle value defined by the pilot control, in the inertia phase, to the current driving status.

FIG. 12 shows the course of pressure at the engaging clutch. It is apparent that the pressure fluctuations occurring in the inertia phase are very slight because of the closed-loop control. The maximum pressure to be set by the end of shifting is not shown.

If the frequency of the PWM signal is lowered to 35 Hz, using the same controller parameters as before, then the result is again closed-loop control with attractive results. Although the controller cannot entirely follow the specification of the desired values, nevertheless that fact actually promotes smoothness of shifting in a shifting operation, since the moment jump at the end of shifting is reduced further.

We claim:

1. In a control device for an automatic motor vehicle transmission having electrohydraulically actuated gearshift elements actuated by hydraulic pressure varied in multiple phases and then regulated by closed-loop control for increasing smoothness of shifting during a shifting operation, the improvement comprising:

(a) means for rapidly bringing the hydraulic pressure to a desired variable by an open-loop control signal with a long duty cycle, in a first phase of the shifting operation in which idle travels of the gearshift elements are overcome;

(b) means for building up the hydraulic pressure with a high duty cycle in a second phase of the shifting operation in which a transmission input moment changes over from the gearshift element of an old gear to the gearshift element of a new gear; and (c) means for:
   (ca) first rapidly open-loop controlling the hydraulic pressure to approach a desired variable, and
   (cb) thereafter closed-loop controlling the hydraulic pressure,
through a change in the duty cycle in a third phase of the shifting operation in which a drop in engine rpm required to perform the gear change takes place.

2. The control according to claim 1, wherein the shifting operation occurs in a traction mode.

3. The control according to claim 1, including a fuzzy logic pilot control defining the duty cycle at the beginning of the third phase of the shifting operation.

4. The control according to claim 3, wherein said fuzzy logic pilot control receives a standardized transmission input moment and a standardized servo moment factor as input variables.

5. The control according to claim 3, including a fuzzy logic controller defining the duty cycle in the course of the third phase of the shifting operation.

6. The control according to claim 5, wherein said fuzzy logic controller receives a standardized difference between a desired rise and an actual rise in the rpm of the engaging gearshift element, and a derivation over time of that difference, as input variables.

* * * * *